United States Patent
Guida

(10) Patent No.: US 10,080,121 B2
(45) Date of Patent: Sep. 18, 2018

(54) SYSTEM AND METHOD FOR REMOTE COMMUNICATION

(71) Applicant: TBWA\RAAD Middle East, Dubai (AE)

(72) Inventor: Rafael Guida, Dubai (AE)

(73) Assignee: TBWA\RAAD Middle East, Dubai (AE)

( * ) Notice: Subject to any disclaimer, the term of this patent is extended or adjusted under 35 U.S.C. 154(b) by 407 days.

(21) Appl. No.: 13/836,961

(22) Filed: Mar. 15, 2013

(65) Prior Publication Data

US 2014/0024312 A1 Jan. 23, 2014

Related U.S. Application Data

(60) Provisional application No. 61/673,242, filed on Jul. 18, 2012.

(51) Int. Cl.
*H04B 7/00* (2006.01)
*H04W 4/80* (2018.01)
*H04W 4/00* (2018.01)

(52) U.S. Cl.
CPC ............. *H04W 4/80* (2018.02); *H04W 4/008* (2013.01)

(58) Field of Classification Search
CPC ............... H04W 4/008; H04W 1/7253; H04W 1/72533; H04W 5/0031–5/0068
USPC .... 455/3.03, 3.04, 408, 419, 420, 92, 151.1, 455/352, 353, 41.1–41.3
See application file for complete search history.

(56) References Cited

U.S. PATENT DOCUMENTS

| | | | |
|---|---|---|---|
| 6,983,124 B1 * | 1/2006 | Bayley | G06K 7/10881 340/10.3 |
| 7,339,493 B2 * | 3/2008 | El Zabadani | A61B 5/0062 340/12.5 |
| 7,558,526 B2 * | 7/2009 | Guo | A63B 24/0062 455/3.06 |
| 8,135,624 B1 * | 3/2012 | Ramalingam | H04W 4/029 705/26.1 |
| 8,200,203 B1 * | 6/2012 | Christensen | G06Q 20/20 455/3.05 |
| 8,359,069 B2 * | 1/2013 | Holmes | H04M 1/7253 455/41.2 |
| 8,831,517 B2 * | 9/2014 | Shankaranarayanan | H04L 12/1475 455/41.2 |
| 8,942,694 B2 * | 1/2015 | Woo | G08C 17/02 455/420 |
| 8,954,047 B2 * | 2/2015 | Macaluso | G06F 8/63 455/418 |
| 2002/0065041 A1 * | 5/2002 | Lunsford | H04M 1/275 455/41.2 |

(Continued)

*Primary Examiner* — Edward Urban
*Assistant Examiner* — Rui Hu
(74) *Attorney, Agent, or Firm* — Hunton Andrews Kurth LLP

(57) ABSTRACT

A method, device, and system for a user to place an order with a service provider using a Bluetooth-enabled apparatus that connects to a Bluetooth-enabled phone. Upon pressing a button on the Bluetooth-enabled apparatus, the apparatus and the phone automatically pair, and the phone automatically dials a preset number and sends a preset message to the service provider. A confirmation can be sent to the user. An order can also be placed automatically when the lid of the apparatus is opened. The apparatus can include indicator lights to signal errors and/or the status of the order.

18 Claims, 9 Drawing Sheets

(56) References Cited

U.S. PATENT DOCUMENTS

| | | | |
|---|---|---|---|
| 2003/0158796 A1* | 8/2003 | Balent | G06Q 10/087 705/28 |
| 2005/0037710 A1* | 2/2005 | Chen | G06Q 10/087 455/66.1 |
| 2006/0031515 A1* | 2/2006 | Van Gassel | H04W 88/04 709/227 |
| 2007/0011041 A1* | 1/2007 | Bourne | G06Q 10/06 340/572.3 |
| 2007/0135110 A1* | 6/2007 | Athale | H04M 1/274516 455/418 |
| 2007/0149174 A1* | 6/2007 | Torvinen | H04M 15/00 455/412.1 |
| 2007/0190938 A1* | 8/2007 | Hillyard | H04W 8/005 455/41.1 |
| 2009/0005005 A1* | 1/2009 | Forstall | H04W 4/50 455/411 |
| 2009/0048021 A1* | 2/2009 | Lian | A63F 13/06 463/37 |
| 2009/0264098 A1* | 10/2009 | Lo | G06Q 20/4012 455/411 |
| 2010/0041333 A1* | 2/2010 | Ungari | H02J 7/00 455/41.2 |
| 2010/0280918 A1* | 11/2010 | Balent | G06Q 10/087 705/26.81 |
| 2011/0021140 A1* | 1/2011 | Binier | H04B 5/0043 455/41.1 |
| 2011/0055901 A1* | 3/2011 | Karaoguz | G06F 21/10 726/4 |
| 2011/0195703 A1* | 8/2011 | Griffith | H04M 1/0216 455/422.1 |
| 2012/0191567 A1* | 7/2012 | Williams | G06Q 20/0855 705/26.8 |
| 2012/0264375 A1* | 10/2012 | Shankaranarayanan | H04L 12/1475 455/41.2 |
| 2012/0276870 A1* | 11/2012 | Davis | G06Q 20/123 455/407 |
| 2013/0130208 A1* | 5/2013 | Riscalla | G06Q 30/0603 434/127 |
| 2013/0143519 A1* | 6/2013 | Doezema | G08B 21/0446 455/404.2 |
| 2013/0217332 A1* | 8/2013 | Altman | H04H 60/90 455/41.2 |
| 2013/0222116 A1* | 8/2013 | Barry, III | G06Q 50/22 340/10.1 |
| 2013/0331028 A1* | 12/2013 | Kuehnel | H04W 76/10 455/41.1 |
| 2014/0128053 A1* | 5/2014 | Merchant | H04W 4/70 455/419 |
| 2014/0206290 A1* | 7/2014 | Lee | H04W 8/005 455/41.2 |
| 2014/0379371 A1* | 12/2014 | Tran | G06Q 50/22 705/2 |

* cited by examiner

100

210

250

230

270

300

400

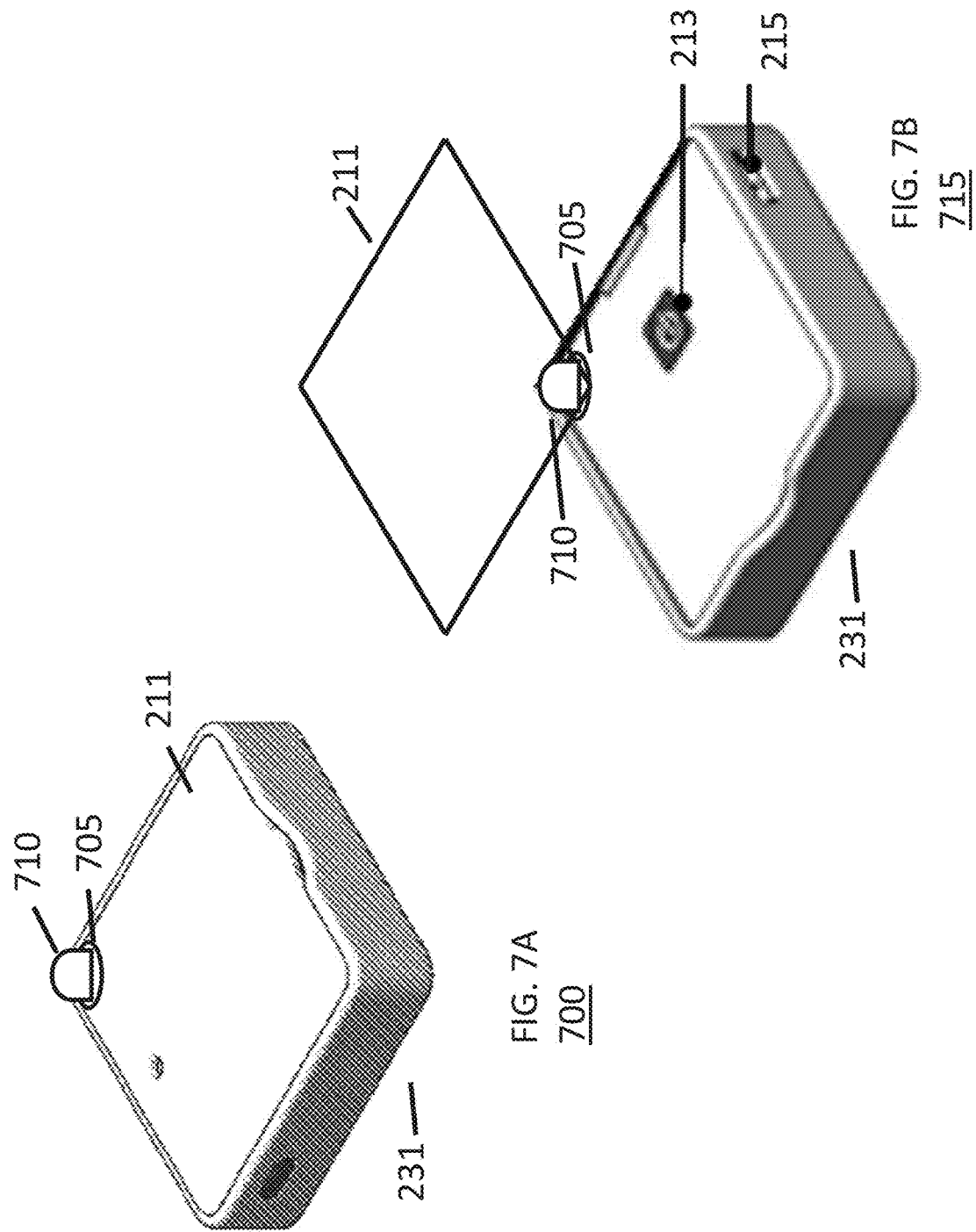

815

800

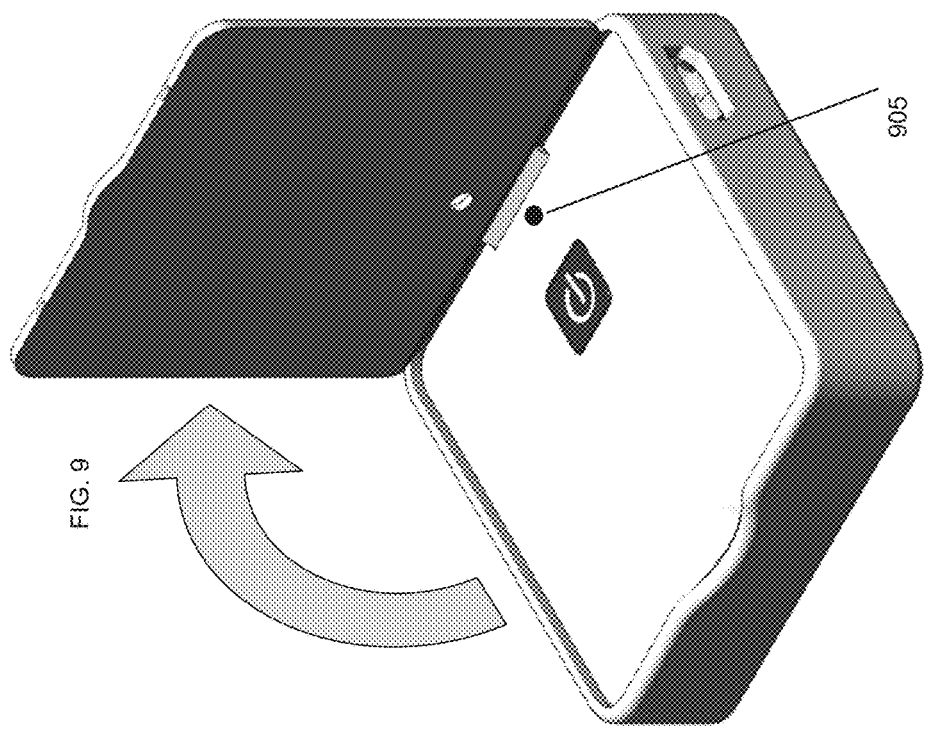

SYSTEM AND METHOD FOR REMOTE COMMUNICATION

CROSS-REFERENCE TO RELATED APPLICATIONS

This application claims priority to U.S. Provisional Application Ser. No. 61/673,242, filed on Jul. 18, 2012, entitled "System and Method for Remote Communication," which is herein incorporated by reference in its entirety.

FIELD OF THE INVENTION

The present invention relates to mobile communication systems, more specifically it relates to remote mobile ordering devices.

BACKGROUND INFORMATION

Traditionally an individual communicates with a service provider either by using a telephone or by the use of email. The service provider can in turn respond to the individual using the same means. Certain service providers provide their customers with the same type of products on a routine basis. For example, a customer can place an order for their favorite pizza with their local pizzeria on a regular basis. However, because of the pizzeria's large client base, the customer most likely has to repeat their order rather than expect the pizzeria to specifically hold their order in memory. Further, with today's hectic lifestyles, many individuals seek to spend as little time as possible in placing their food orders, or any other tasks. Also, businesses are interested in offering all, and especially their most loyal, customers with simple and fast service to demonstrate an appreciation for their business.

SUMMARY OF THE INVENTION

The present invention provides for a method, device, and system for remote communication using a wireless communication device (also "apparatus"), the wireless communication device transmitting data using a protocol recognizable by another communication device, the other communication device being capable of automatically transmitting the data to a third party using conventional methods upon activation by the wireless communication device. In an embodiment, the communication device is a mobile phone and/or a smartphone. In an embodiment, the communication device is a landline telephone. In an embodiment, the communication device is a processor. In an embodiment, the communication protocol used is BLUETOOTH, and activation of data transmission by the other communication device is by the push of a button and/or other activation activity on the wireless communication device.

In an embodiment, a method for remote communication between a sender using a first wireless device, a second device, and a recipient includes the first wireless device transmitting a predefined message and an identification to the second device. The method for remote communication includes that the second device transmitting the predefined message to the recipient upon an indication by the sender, and the recipient associating the predefined message with the sender based on the identification. In an embodiment, the method of the first device is a BLUETOOTH transmitter and the second device includes a BLUETOOTH receiver. In an embodiment, the method includes the second device is at least one of: a mobile phone and a telephone. In an embodiment, the method includes that the second device calls the recipient.

In an embodiment, the method includes that the second device automatically disconnects after a specifiable time period within which the recipient does not receive a call. In an embodiment, the method includes that the second device automatically transmits a missed call message, responsive to an error in the transmission. An acknowledgment can be automatically sent to the sender upon receipt of the predefined message. In an embodiment, the predefined message is programmable.

In an embodiment, an apparatus for transmitting a predefined message, the apparatus includes a wireless communications circuit capable of transmitting only a predefined message powered by a battery. In an embodiment, the apparatus includes a magnetic strip for connecting the apparatus to a magnetic surface. The apparatus can include an activation button for activating the wireless communications circuit, and a lid.

In an embodiment, the apparatus includes an indicator that shows whether the wireless communications circuit is paired with another device. In an embodiment, the wireless communications circuit of the apparatus uses a BLUETOOTH protocol. In an embodiment, the apparatus automatically powers on when the lid is opened, and the wireless communications circuit automatically pairs with another device. In an embodiment, the predefined message transmitted by the wireless communications circuit is programmable.

BRIEF DESCRIPTION OF THE DRAWINGS

FIG. 7A shows a perspective view of an example wireless communication apparatus have a swivelable lid in a closed state.

FIG. 7B shows a perspective view of an example wireless communication apparatus having a swivelable lid in an open state.

FIG. 9 shows a perspective view of an example wireless communication apparatus having a noise indicator.

DETAILED DESCRIPTION

An embodiment of the present invention provides a method, device, and system for placing an order using a Bluetooth-enabled apparatus that connects to a Bluetooth-enabled mobile phone and upon pressing a button or contact area on the device, calls a phone number to communicate that an order has been placed. The order can be a preprogrammed and/or sent by a conventional method, for example, in the form of a text message, Short Message System ("SMS"), and/or Email.

Figure 1:
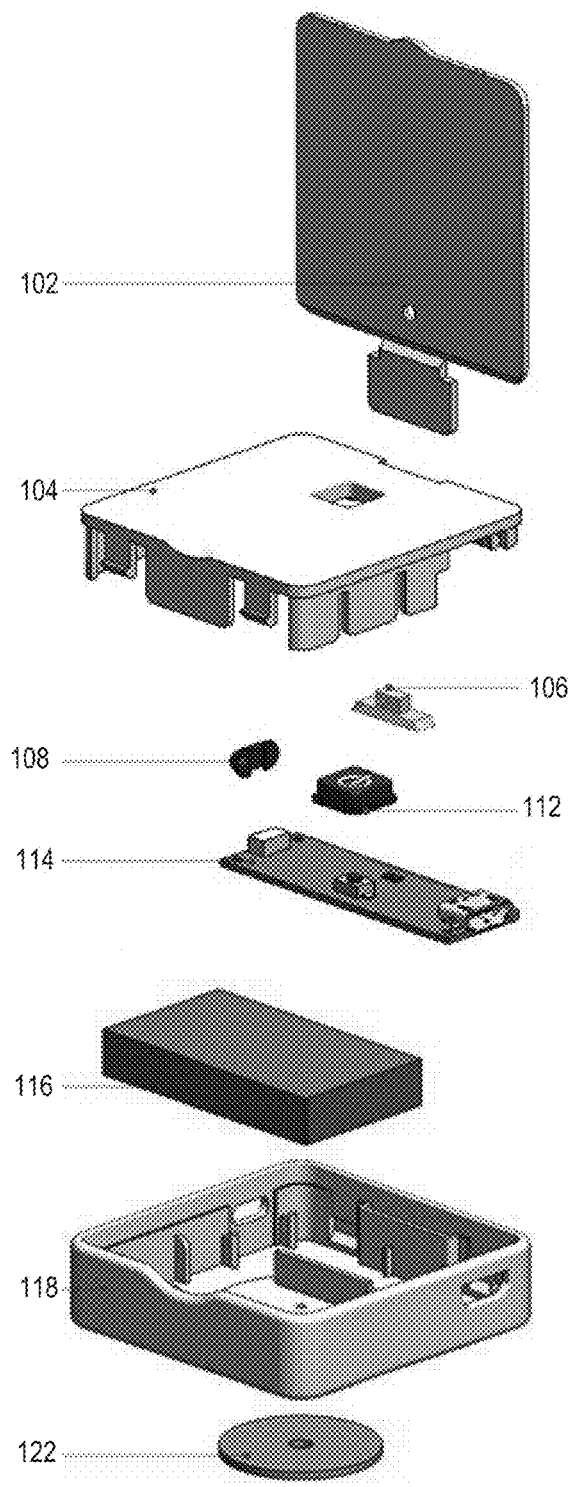
FIG. 1 is an exploded view of an example wireless communication apparatus that can be used to place an order.

FIG. 1 shows an example wireless communication apparatus 100 ("BLUETOOTH-enabled device" for convenience) that can be used to place an order. The apparatus 100 can contain a magnet 122, an activation button 112, a printed circuit board assembly (PCBA) 114, and a battery 116. In an embodiment, the apparatus 100 can include: a front case 104, a main case 118, a lid 102, an indicator 106, and/or a pair key 108.

The magnet 122 can be used to attach the apparatus 100 to a magnetic surface, such as a refrigerator. In an embodiment, the magnet 122 is mounted on the exterior of the main case 118. The front case 104 and the main case 118 can protect the circuitry and sensitive components of the apparatus 100 from the environment and leave only the activation button 112 and the magnet 122 exposed for use. The exterior of the magnet can be modified for marketing purposes. For example, the main case 118 and front case 104 can be designed in any shape, such as a star, shoe, bottle, and food. For example, the main case 118 and front case 104 can depict the service and/or good being offered. Examples of goods and services include but are not limited to restaurants delivering food, stores delivering bottles of beverages, shoe shining services, ticket purchase service for sporting and entertainment events, and laundry and dry cleaning services. The lid 112 can be designed to include a screen showing the good and/or service offered. The lid can be a screen showing advertisements for local businesses utilizing the apparatus.

In an embodiment, the surface of the front case 104 can have any design showing the goods and/or services being offered by pressing the button. The design can include, but is not limited to text and graphics.

The PCBA 114 is powered on when the lid 102 is opened. The PCBA 114 contains circuitry for transmitting and/or receiving a signal. In an embodiment, the PCBA 114 is enabled for a wireless protocol, for example, BLUETOOTH-enabled. The battery 116 is used to power the apparatus and can be single-use or re-chargeable. The lid 102 can further protect the activation button 112 from being accidentally pushed. The lid 102 can contain a window for convenient viewing of the indicator 106 without opening the apparatus 100.

An indicator 106 can be a LED light showing the status of the apparatus 100. For example, multiple colors can be used; one color can show whether the apparatus 100 has successfully paired; another color can show that the order has been successfully placed. In an embodiment, the indicator 106 shows when the apparatus is connected to a power source 606, as in FIG. 6, described below, and/or is fully charged. In an embodiment, the indicator 106 flashes in red when the device is not connected via BLUETOOTH to a BLUETOOTH-enabled phone, and can flash in blue when the device is connected to a BLUETOOTH-enabled phone. In an embodiment, a display screen can be a part of the device to indicate whether an order has been placed, or error message regarding, e.g., transmission.

In an embodiment, indicator 106 can be a noise indicator and/or speaker, such that a specific sound is emitted from the device when the user interacts with the apparatus. FIG. 9 shows a place through the front case for a speaker or other noise emitting device. For example, one sound can be emitted when the apparatus is successfully paired. Another sound can be emitted to confirm to the user that an order has been placed. A specific sound can be emitted when the apparatus is charging, and/or low on power. In an embodiment, the user can customize the apparatus such that a specific sound is programmed to a specific task. For example, the user can set the functions when initiating the apparatus.

In an embodiment, a pair key 108 allows the user control over whether to pair with a device. If the apparatus 100 does not automatically pair, the pair key 108 can be provided. The pair key 108 can be a sliding key with one position for pairing and another for turning off pairing.

In an embodiment, when the lid 102 is opened, the PCBA 114 is powered on. The power can be provided by the battery 116. In an embodiment, a BLUETOOTH-enabled apparatus waits on standby for Bluetooth connection with a BLUETOOTH-enabled phone, but only connects when the user pushes the activation button 112. The apparatus 100 can pair via BLUETOOTH to a BLUETOOTH-enabled mobile phone (not shown), and the mobile phone can automatically dial a preset number. For example, the preset number can be associated with a service provider. The button 112 establishes a Bluetooth connection creating a personal area network ("PAN"), directing the apparatus to contact a telephone number. The apparatus 100 can pair automatically or the user can activate pairing via the pair key 108. In an embodiment, the mobile phone can automatically disconnect when the call is received. In an embodiment, the phone automatically disconnects after a specified number of rings. In an embodiment, the phone automatically disconnects after a specified period of time.

In an embodiment, the phone number associated with the phone placing the call is recorded via caller ID by a receiving party. In an embodiment, the mobile phone can transmit the phone number such that a missed call identifying the caller is received by the service provider. In an embodiment, the receiving party (also referred to as the recipient) records the mobile phone number upon receipt and cross-references it with a database listing specific details about the mobile phone number, such as the order. In an embodiment, the receiving party records the mobile phone number upon receipt and cross-references it with a database listing a desired order, and if there exists a desired order, an automated SMS message can be sent to the phone number confirming that the desired order has been received and is being processed.

In an embodiment, the receiving party records the phone number upon receipt and cross-references it with a database listing a desired order, and if no desired order is listed for that phone number, the receiving party will contact the phone number to obtain further details. In an embodiment, the receiving party records the phone number upon receipt, cross-references it with a database listing specific details about the mobile phone number, and can send these details via Email, SMS, or voice API (application programming interface) to an alternate phone number for processing. An automated SMS can be sent to the phone number to confirm for processing.

In an embodiment, the button 112 can be any design that permits user-initiated contact between the button 112 and PCBA 114. For example, the button can be a switch, a lever, and/or a rotatable handle. Or, for example, the contact or activity area could be a touchscreen or different contact area. Or, for example, the activity area (e.g., the button) can be a biometric read, such that when a specific thumb/finger print is read, the preprogrammed order associated with that thumb/finger print is sent. Thus, one device or system can be applicable for multiple persons or any persons. A database according to the embodiments described here is kept which also keeps track of an extra field of the specific thumb/finger print associated with an order. Or, for example, the activity area could be a numeric- and/or alpha-code that works in a similar fashion for identification purposes with the order. Such provides additional security, without removing the convenience provided by the present invention.

Figure 8B:
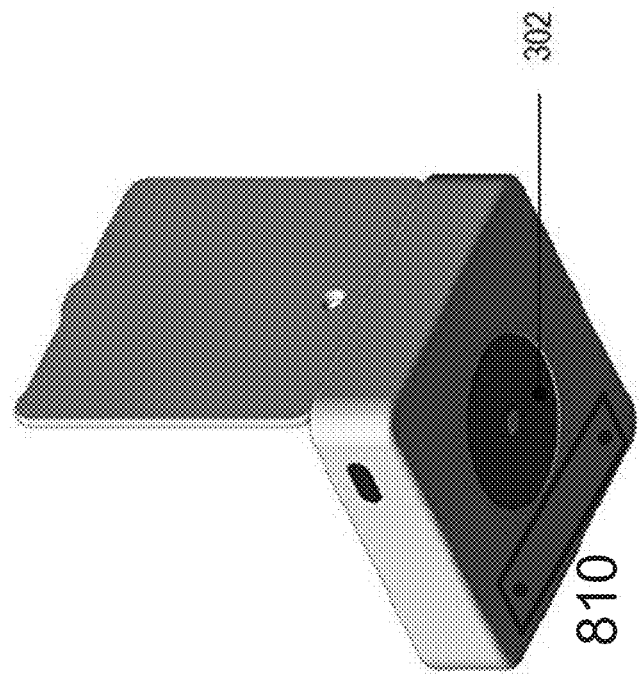
FIG. 8B shows a perspective view of an example wireless communication apparatus having a removable battery panel.
Figure 8A:
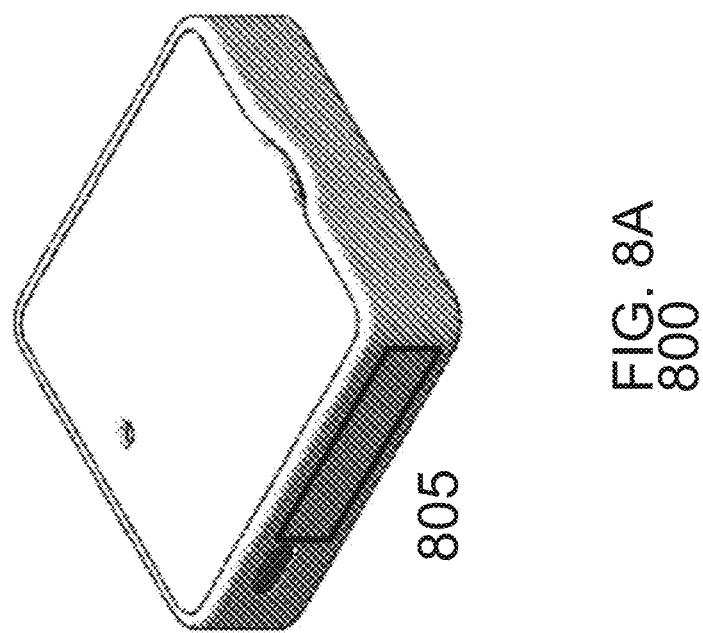
FIG. 8A shows a perspective view of an example wireless communication apparatus having a removable battery panel.

In an embodiment, the battery 116 can be positioned in the apparatus such that it can be replaced. For example, since batteries have a limited life, the user cannot use the apparatus once the battery dies. In an embodiment, the battery 116 can be accessible via an opening in the main case 118 and/or front case 104. The main case 118 and/or front case 104 can have an opening to allow a user to remove and replace the battery. In an embodiment, the main case 118 and/or front case 104 can have a panel that is removably attached, such that the user can access the battery by detaching a panel. FIGS. 8A and 8B show examples of an opening 805 and a panel 810. For example, the panel can be attached by conventional screws, and/or a clip that is formed as part of the panel.

Figure 2A:
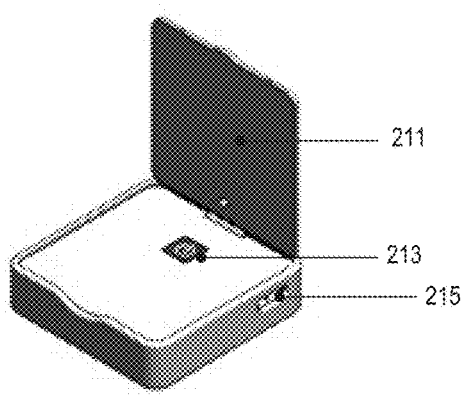
FIG. 2A shows an example wireless communication apparatus having a lid in an open position.

FIGS. 2A to 2D show various components of the case of a wireless communication apparatus. FIG. 2A shows an assembled example wireless communication apparatus 210 having a lid 211 in an open position. The apparatus 210 can also have an activation button 213, a connection port 215, and a second connection port (not shown). The connection port 215 can receive various input, for example, mini-USB (Universal Serial Bus). In an embodiment, the connection port 215 can be used to connect an AC recharging adapter. In an embodiment, the connection port 215 can also be used to charge via USB and connect the device to a computer to program the preset number and preset message. For example, the preset message is preprogrammed and can be a specific order, such as the combination of topping on a pizza. The preset number can be the phone number of the local pizzeria. In an embodiment, two separate ports are used for AC charging and USB charging.

Figure 2C:
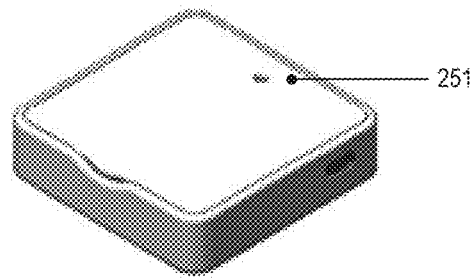
FIG. 2C shows an example wireless communication apparatus having a lid in a closed position.
Figure 2B:
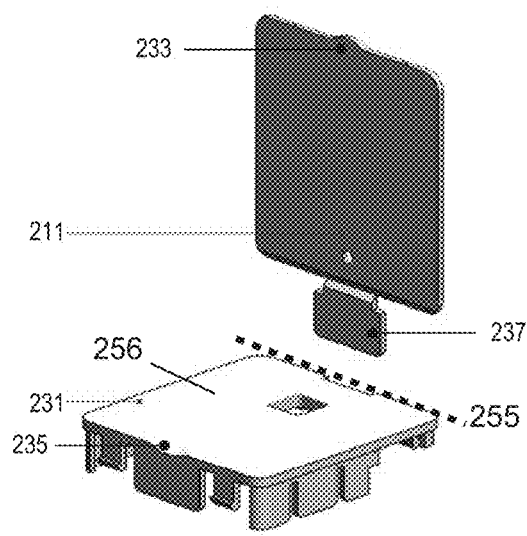
FIG. 2B shows an example of a disassembled lid and front case of a wireless communication apparatus.

FIG. 2B shows a disassembled lid 211 and front case 231 of an example wireless communication apparatus 230. The lid 211 can have a component 237 for locking into the body of the apparatus 230 via the front case 231. In an embodiment, the locking component 237 is a hinge, such that the lid can rotate about an axis 255 created by the hinge to open and close. The lid can also have a tab 233. The tab 233 protrudes from the edge of lid 211. The tab 233 is positioned to correspond to a lip 235 of the front case 231. The lip 235 can be a groove and/or depression, such that when the lid is closed, a user can easily open the lid 211. In an embodiment, the tab 223 can have a hook and the frame can have a spring latch, such that the lid can be pressed to compress the spring and release the latch to open the lid from the frame.

In an embodiment, the lid 211 can be attached to the front case 231 by a mechanical coupling. For example, the coupling can be a hinge, clasp, hook, and pin. The lid 211 can rotate around an axis parallel to a side of the front case 231. The lid 211 can swivel around a corner point to slidably, and/or swivelably open. FIGS. 7A and 7B show the lid 211 being swivelable. FIG. 7A is a perspective view 700 of an apparatus with the lid 211 closed. FIG. 7B is a perspective view 715 of an apparatus with the lid swiveled open. Collar 705 and pin 710 ensures the lid 211 remains closed, as shown in FIG. 7A unless the user manually swivels the lid open, as shown in FIG. 7B.

In an embodiment, when the lid 211 is opened, the PCBA (not shown) powers on and pairs via BLUETOOTH to a BLUETOOTH-enabled phone. When the lid 211 is closed, the PCBA powers off. In an embodiment, when the lid 211 is open, and activation button 213 is depressed, a preset number is dialed via the paired mobile phone.

Other wireless communication technologies can be used with the present invention. BLUETOOTH is an example of a working transmission system to be used with the present invention.

FIG. 2C shows an example wireless communication apparatus 250 having a lid in a closed position. As described above, the lid can have a window 251 that enables a user to view an indicator mounted on the apparatus beneath the lid. For example, the window 251 can be large enough to permit the light of a light indicator to pass through. For example, the window 251 is the size of a pinpoint. The window can be large enough to allow sound to emit when the indicator is a noise and/or sound indicator.

Figure 2D:
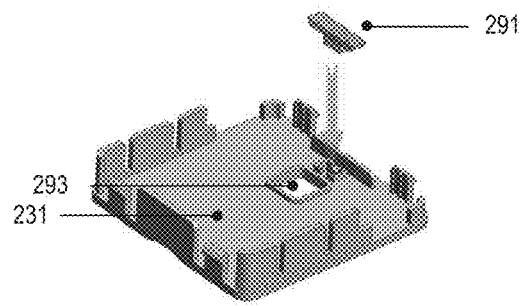
FIG. 2D shows an interior of a front case of an example wireless communication apparatus.

FIG. 2D shows an interior ("backside") of a front case 231 of an example wireless communication apparatus 270. The front case 231 can have an opening 293 for at least part of an activation button to be placed through. A top surface 256 of the front case 231 covers the internal components and shows only the activation button. An indicator 291 can be attached to the backside of the front case 231. For example, the indicator can be attached by snapping into a recess of the front case 231. The opening 293 of the front case 231 is positioned such that the indicator 291 is aligned with the window on the lid 251 described above.

Figure 3:
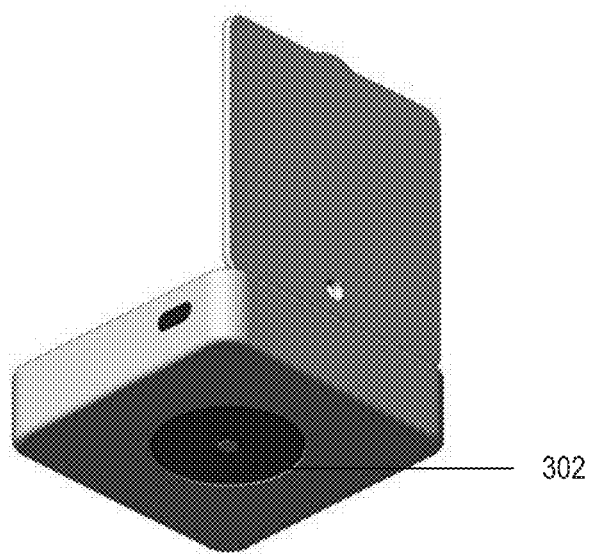
FIG. 3 shows a magnet mounted on an example wireless communication apparatus.

FIG. 3 shows a magnet 302 mounted on an example wireless communication apparatus 300. The apparatus can have one or more magnets to attach to a magnetic surface. The magnet can be circular in shape (as shown), a rectangular strip (not shown), and any other shape. The shape of the magnet can fit the main case 231. For example, the main case 231 can have a recess the shape of the magnet 302 such that the surface is flat to be connected to a magnetic surface. The recess can be the shape of any mechanical joining such as a clip, stand, and hook. The recess can be the shape of an adhesive, such as Velcro, tape, or removable adhesive. In an embodiment, the magnet 302 can be another material for attaching the apparatus to a surface, for example, a removable adhesive, VELCRO and/or tape. A removable adhesive can be a adhesive that does not remain on a surface of an object. For example, a user can attach the apparatus including but not limited to a wall, countertop, and/or cupboard. The removable adhesive keeps the apparatus attached until the user desires to remove it. When the apparatus is removed from the wall, countertop, and/or cupboard, no residue adhesive remains on those surfaces. In an embodiment, the apparatus can be designed to be attached as a keychain. In an embodiment, the apparatus has a mechanical joining and/or coupling attached to a surface of the case, such as a clip, hook, and/or clasp. In an embodiment, the apparatus can have a stand to support the device in an upright state on any surface. The apparatus can be mounted on any surface for the convenience of the user. For example, a clip can attach the apparatus to a car visor or shelf.

Figure 4:
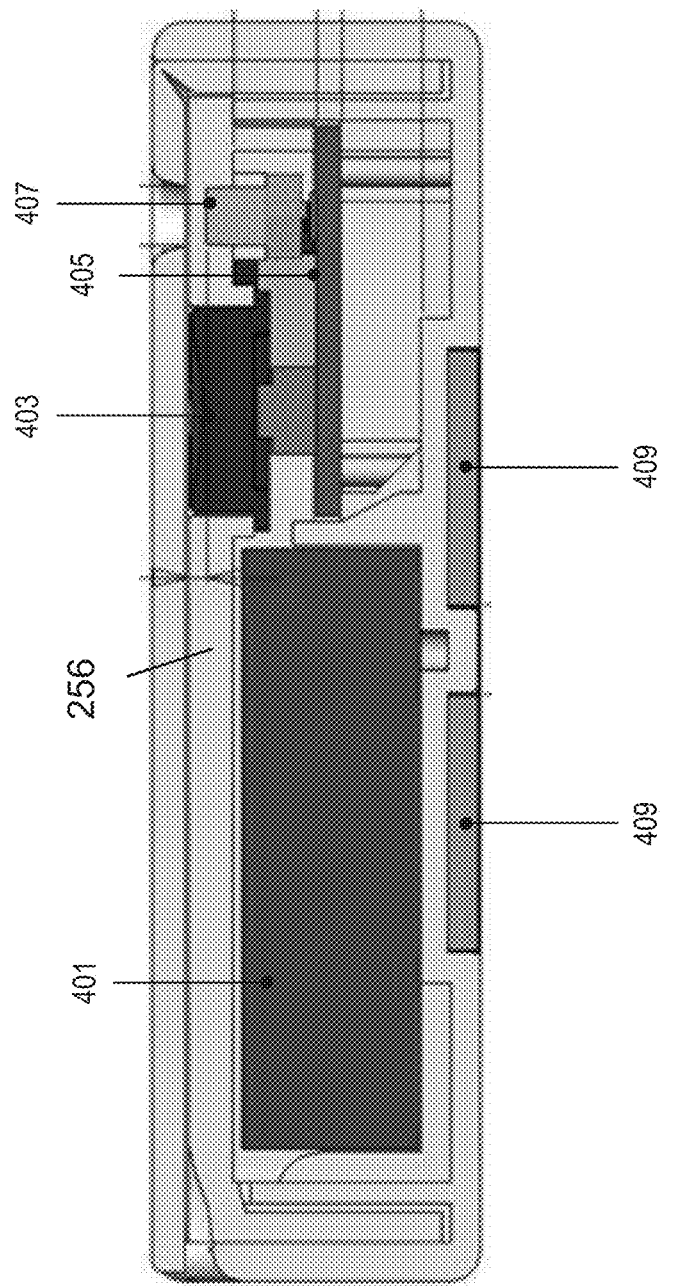
FIG. 4 shows a cross-sectional view of an example wireless communication apparatus.

FIG. 4 shows a cross-sectional view of an example wireless communication apparatus 400. The apparatus 400 has a battery 401, a magnet 409, an activation button 403, a PCBA 405, and an indicator 407. The activation button 403 can be movable substantially perpendicular to the top surface 256 of the front case 231 such that the activation button 403 is pressed to turn on a switch on the PCBA 405, thereby activating the apparatus 400.

In an embodiment, the wireless communication device is configured to operate in a wireless network, and the communication device is a device capable of running a Web application, including mobile application, for transmitting data to the third party.

In an embodiment, the wireless communication device has an auto-connect feature enabling the device to automatically turn on and off responsive to a compartment on the wireless communication device being moved, for example, the lid being opened and closed.

In an embodiment, the apparatus is initially synced with a user's mobile phone. A user presets the apparatus via a website over the Internet. In an embodiment a user presets the apparatus via the BLUETOOTH device. For example, a user can select a particular good or service to order from a business using the apparatus. The user's particular selection is tied to the user's account. For example, when the order is placed, the user is charged for the goods and/or services. Once the apparatus is synced with the user's particular selection, the user can press the activation button on the apparatus. In an embodiment, the user is a sender. When the sender presses the activation button, information is transferred automatically to a recipient. For example, a business, such as a restaurant, is a recipient. The apparatus can interact with a specific restaurant. A user's particular selection can be a favorite meal. The user presses the activation button, thereby ordering their favorite meal from the restaurant. The user receives a confirmation SMS message of their order. For example, if the order was a mistake, the user can cancel the order. The user can change the preset selection at any time. In an embodiment, the user changes their particular selection via a website over the Internet.

In an embodiment, the apparatus includes a global positioning system ('GPS'). The GPS can track a user's location. The location can be transmitted with the particular selection when the user presses the activation button. For example, the user can have the goods and/or services delivered to wherever the apparatus is physically located.

In an embodiment, the apparatus can be utilized in connection with a licensed backend POS/CRM ("Point of Sale")("Customer Relationship Management"). The POS can integrate with a business' POS for direct communication and a desired end-to-end solution.

Figure 5:
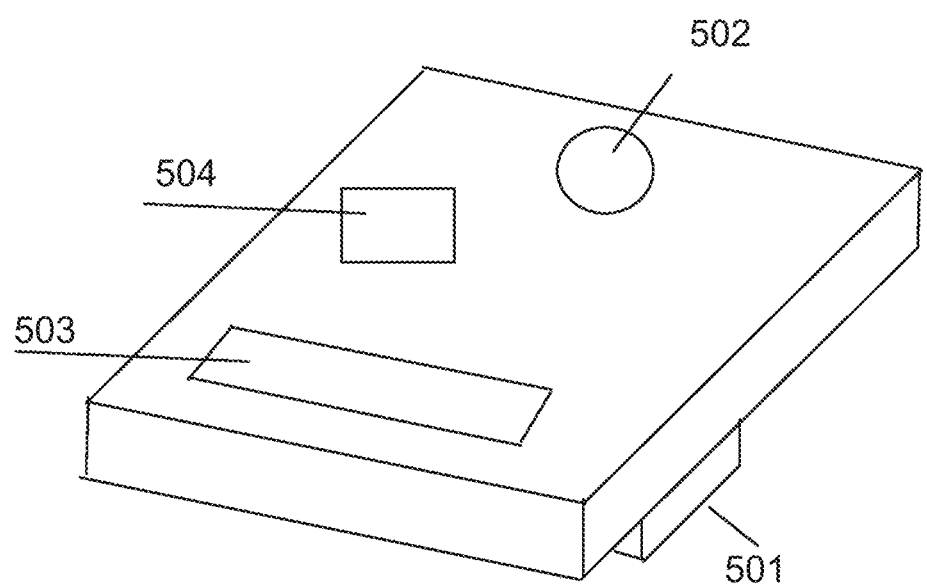
FIG. 5 shows a perspective view of an example wireless communication apparatus.

FIG. 5 shows an example of an embodiment of the invention which provides a Bluetooth enabled apparatus containing a magnetic strip 501, power button 502, a Bluetooth PCBA 503, and a battery 504. When the power button 502 is pressed, the PCBA 503 is powered. In an embodiment, when the power button 502 is pressed it pairs via Bluetooth a Bluetooth enabled mobile telephone and the mobile telephone immediately dials a preset number. In an embodiment, the mobile telephone automatically disconnects when the call is received.

Figure 6:
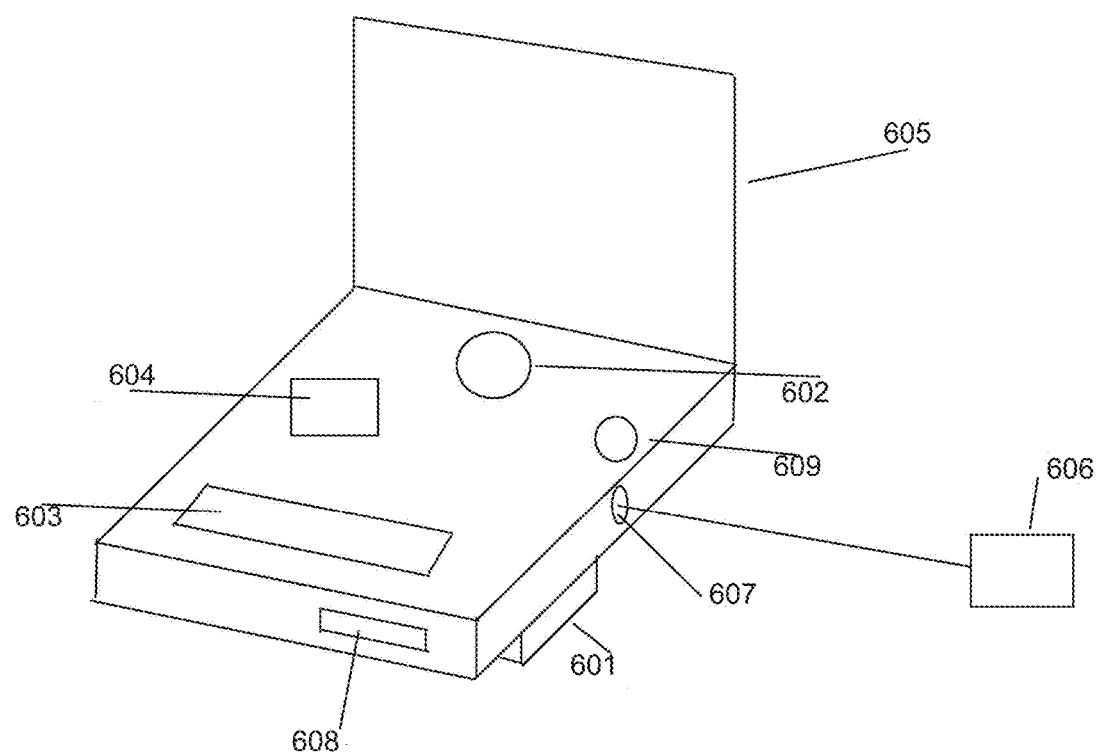
FIG. 6 shows a perspective view of an example wireless communication apparatus.

FIG. 6 shows an example of an embodiment of the invention which provides a Bluetooth enabled apparatus containing a magnetic strip 601, an activation button 602, a Bluetooth PCBA 603, a battery 604 and a lid. In an embodiment, the PCBA 603 is powered on when the lid is opened. In an embodiment, when the lid 605 is open and activation button 602 is depressed, a preset number is dialed via the connected mobile telephone.

In an embodiment, the apparatus can be charged by connecting to a power source 606. The power source 606 can be connected to the apparatus by input 607. In an embodiment, the power source 606 can be connected to the apparatus via USB charging adaptor 608.

In an embodiment, an LED light 607 informs the user of the status of the apparatus. For example, the LED light 607 can flash red when the apparatus is not connected via Bluetooth to Bluetooth enable phone or flashes in blue when the device is connected to a Bluetooth enabled phone.

The descriptions and illustrations of the embodiments above should be read as example and not limiting. Modifications, variations, and improvements are possible in light of the teachings above and the claims below, and are intended to be within the spirit and scope of the invention.

The subject matter defined in the appended claims is not necessarily limited to the specific features, or specific implementations described above. Many other configurations of computing devices, communications features, applications, and distributed software and/or hardware systems can be employed to implement the described invention as claimed. The specific features and methods described above are thus disclosed as example forms of implementing the claims and embodiments, and can be used in combination with and without each other.

What is claimed is:

1. A method for remote communication between a sender using a communication device, a phone, and a recipient device, the method comprising the steps of:
   at the recipient device, receiving a communication including a message from the phone, wherein:
      the communication is sent by the phone based on information identifying the recipient device and in automated response to a wireless communication from the communication device,
      the phone sends the communication by automatically calling a telephone number of the recipient device in response to the wireless communication,
      a single user action applied to a button on the communication device is sufficient to trigger an activation of the communication device without any user selection of order details, and
      the communication device sends the wireless communication to the phone in response to the activation;
   at the recipient device, processing a purchase order in response to receiving the communication by:
      associating the purchase order with a user account of the sender; and
      extracting order details that were included in the message;
      wherein the order details include information describing a good or a service to be purchased, and
      wherein the order details were predefined by programming the communication device through a connection to a computer.

2. The method according to claim 1 wherein the communication device includes a BLUETOOTH transmitter and the phone includes a BLUETOOTH receiver.

3. The method according to claim 2, wherein the phone is at least one of a mobile phone and a landline telephone.

4. The method accordingly to claim 1, wherein the phone automatically disconnects after a specifiable time period within which the recipient device does not receive the call.

5. The method according to claim 1, wherein the recipient device automatically sends an acknowledgment to the phone upon receipt of the message.

6. The method according to claim 1, wherein the information identifying the recipient device is stored at the communication device and wirelessly transmitted to the phone in the wireless communication.

7. The method according to claim 1, wherein the order details are programmed over the Internet.

8. The method according to claim 1, wherein the recipient device:
   records a telephone number of the phone;
   cross-references the telephone number of the phone with a database listing a desired order; and
   confirms the desired order by sending an SMS message to the telephone number of the phone.

9. The method according to claim 8, wherein the communication device:
   includes a global positioning system; and
   is configured to include the location of the communication device in the wireless communication that the communication device sends to the phone.

10. A method for remote communication between a sender using a communication device, a second communication device, and a recipient device, comprising:
    at the recipient device, receiving a communication from the second communication device, wherein the communication is sent by the second communication device based on information identifying the recipient device and in automated response to a wireless communication from the first communication device, wherein a single user action applied to a button on the first communication device is sufficient to trigger an activation of the first communication device without any user selection of order details, and wherein the first communication device sends the wireless communication to the second communication device in response to the activation;
    at the recipient device, processing a purchase order in response to receiving the communication by:
      associating the purchase order with a user account of the sender;
      retrieving a missed call message transmitted by the second communication device in response to a transmission error during the call, wherein the missed call message includes a telephone number of the second communication device, wherein the second communication device is at least one of: a mobile phone and a telephone, and wherein the second communication device sends the communication by automatically calling a telephone number of the recipient device in response to the wireless communication; and
      looking up stored order details by cross-referencing the telephone number with a database to obtain the order details from the database.

11. An apparatus for transmitting a predefined message that triggers processing of a purchase order, the apparatus comprising:
    a button,
    wherein a single user action applied to the button is sufficient to trigger an activation of the apparatus without any user selection of order details;
    a memory; and
    a wireless communications circuit powered by a battery;
    wherein:
      the apparatus is configured to wirelessly transmit the message to a phone using the wireless communications circuit in response to the activation,
      the message is configured to automatically trigger the phone to forward the message by automatically calling a telephone number of a recipient device in automated response to receipt of the message at the phone, and
      the message is further configured to cause the recipient device to process the purchase order in response to receiving the message by extracting order details that were stored at the apparatus prior to the activation,
        wherein the order details that were stored include information describing a good or a service to be purchased,
        wherein the order details were stored by programming the apparatus through a connection to a computer, and
        wherein the order details are extracted from the message.

12. The apparatus according to claim 11, further comprising:
    a magnetic strip for connecting the apparatus to a magnetic surface; and
    a lid.

13. The apparatus according to claim 12, further comprising an indicator that shows whether the wireless communications circuit is paired with the phone.

14. The apparatus according to claim 12, wherein the apparatus automatically powers on when the lid is opened, and the wireless communications circuit automatically pairs with the phone.

15. The apparatus according to claim 12, further comprising a connection port for connecting the apparatus to the computer for programming the apparatus with the order details.

16. The apparatus according to claim 11, wherein the wireless communications circuit is configured to use a BLUETOOTH protocol.

17. The apparatus according to claim 11, wherein the message is programmed into the memory.

18. The apparatus according to claim 17, wherein the order details are programmed over the Internet.

* * * * *